(12) United States Patent
Chang

(10) Patent No.: US 7,114,464 B1
(45) Date of Patent: Oct. 3, 2006

(54) CAGE

(75) Inventor: Jhu-Min Chang, Nantou Hsien (TW)

(73) Assignee: Guang-Yi Chang, Nantou Hsien (TW)

( * ) Notice: Subject to any disclaimer, the term of this patent is extended or adjusted under 35 U.S.C. 154(b) by 0 days.

(21) Appl. No.: 11/282,677

(22) Filed: Nov. 21, 2005

(51) Int. Cl.
*A01K 29/00* (2006.01)
*A01K 1/01* (2006.01)

(52) U.S. Cl. ..................... 119/479; 119/161

(58) Field of Classification Search ............... 119/416, 119/417, 419, 452, 458, 459, 463, 479, 482, 119/161, 165, 673, 677, 678, 600, 602, 603, 119/604, 650, 671
See application file for complete search history.

(56) References Cited

U.S. PATENT DOCUMENTS

| | | | | |
|---|---|---|---|---|
| 3,557,756 A | * | 1/1971 | Ramsey ...................... | 119/419 |
| 4,181,612 A | * | 1/1980 | Trail .......................... | 210/169 |
| 4,228,554 A | * | 10/1980 | Tumminaro ................. | 119/161 |
| 4,785,765 A | * | 11/1988 | Campbell et al. ........... | 119/417 |
| 5,032,254 A | * | 7/1991 | Deboer et al. .............. | 209/10 |
| 5,148,771 A | * | 9/1992 | Schuett et al. .............. | 119/479 |
| 5,771,841 A | * | 6/1998 | Boor .......................... | 119/452 |
| 6,532,900 B1 | * | 3/2003 | Wang ......................... | 119/479 |
| 6,626,129 B1 | * | 9/2003 | Schrader .................... | 119/479 |
| 6,629,509 B1 | * | 10/2003 | Fernandez .................. | 119/452 |
| 6,895,899 B1 | * | 5/2005 | Schrader .................... | 119/479 |

FOREIGN PATENT DOCUMENTS

| CA | 2271548 A1 | * | 2/2000 |
|---|---|---|---|
| JP | 2004337136 A | * | 12/2004 |

* cited by examiner

*Primary Examiner*—Son T. Nguyen
(74) *Attorney, Agent, or Firm*—Birch, Stewart, Kolasch and Birch, LLP

(57) ABSTRACT

A cage has an enclosure and a waste-treatment tank. The waste-treatment tank has a holding tank and a holder. The holding tank has an internal chamber, multiple vertical partitions, a horizontal partition and multiple filter tubes. The vertical partitions and the horizontal partitions are mounted inside the internal chamber and the horizontal partition is mounted perpendicular to the vertical partitions and forms multiple chambers. The filter tubes are mounted on the horizontal partition. The holder is mounted on the holding tank and has a waste-collection tray with a flushing hole and a trap connected to the flushing hole. Excrement is collected by the waste-collection tray of the holder and divided by the filter tubes to prevent solid waste from flowing directly into a drainage system. Further, the trap is sealed by water and prevents noxious smells from escaping back into the enclosure.

6 Claims, 4 Drawing Sheets

CAGE

BACKGROUND OF THE INVENTION

1. Field of Invention

The present invention relates to a cage, more particularly to a cage that provides an easy way to clean animal excrement out of the cage.

2. Description of the Related Art

A conventional cage for animals may have a pallet for holding the animal excrement. Because keeper cannot clean the animal excrement immediately, the bad smell will fill whole room, especially in a pet store.

Thus, a real need exists for a cage that provides an easy way to clean the animal excrement.

SUMMARY OF THE INVENTION

The primary objective of the present invention is to provide a cage that has an easy way to clean the animal excrement.

A cage in accordance with the present invention has an enclosure and a waste-treatment tank. The waste-treatment tank has a holder and a holding tank. The holder has a waste-collection tray with a flushing hole and a trap connected to the flushing hole. The holding tank mounted on the holder and has an internal chamber, multiple vertical partitions, a horizontal partition and multiple filter tubes. The vertical partitions and the horizontal partitions are mounted inside the internal chamber and the horizontal partition cross-mounted with the vertical partitions and forms multiple chambers. The filter tubes are mounted on the horizontal partition.

When the cage in accordance with the present invention is used, excrement is collected by the waste-collection tray of the holder and filtered by the filter tubes to prevent solid waste from directly flowing into a drain system. Further, noxious odors will not escape because the trap is sealed with water.

Other objectives, advantages and novel features of the invention will become more apparent from the following detailed description when taken in conjunction with the accompanying drawings.

DETAILED DESCRIPTION OF THE INVENTION

Figure 1:
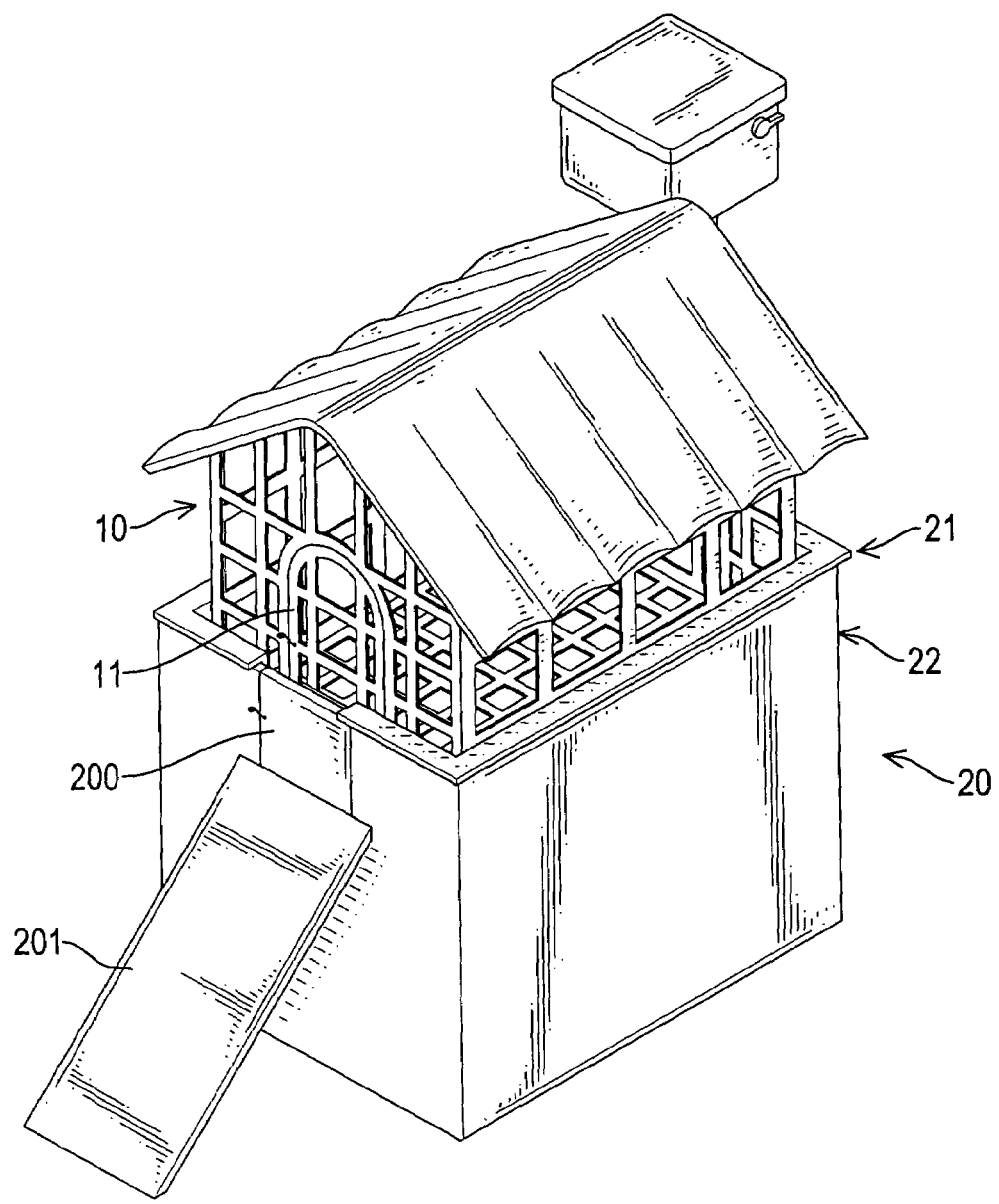
FIG. 1 is a perspective view of a cage in accordance with the present invention.
Figure 2:
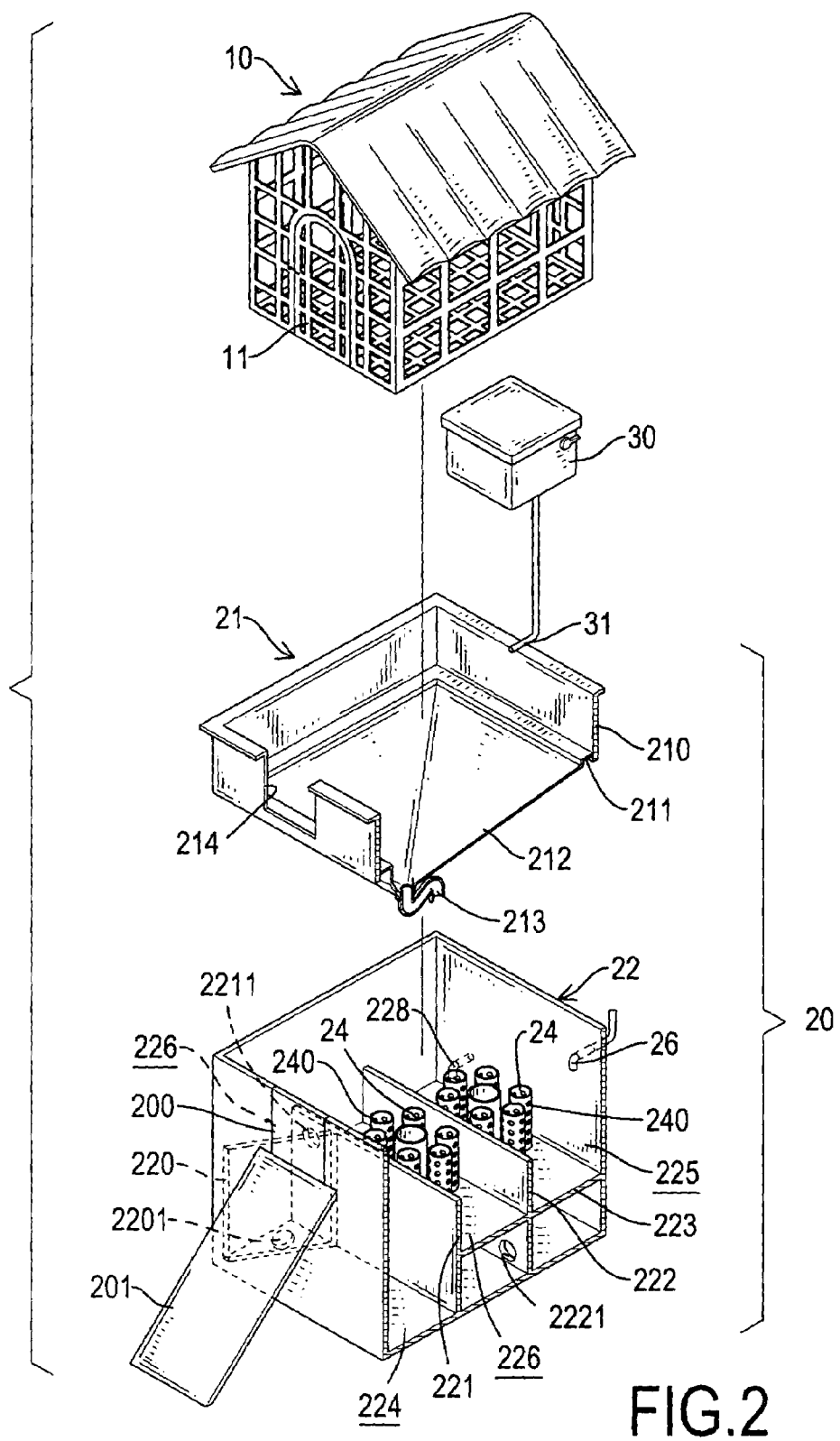
FIG. 2 is an exploded perspective view of the cage in FIG. 1.
Figure 3:
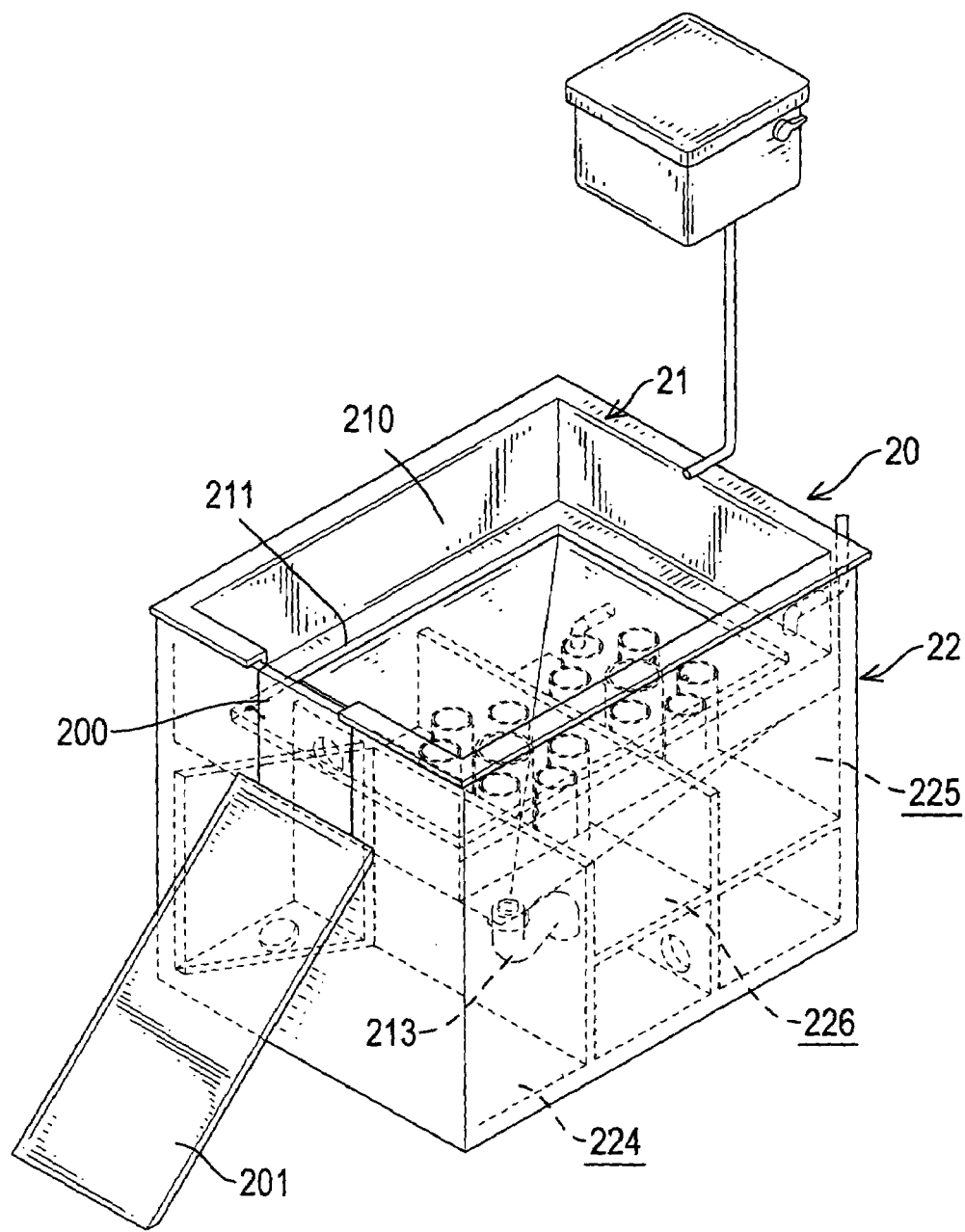
FIG. 3 is a perspective view of a waste-treatment tank of the cage in FIG. 1.

With reference to FIGS. 1 to 3, a cage in accordance with the present invention has an enclosure (10) and a waste-treatment tank (20).

The enclosure (10) may be a conventional enclosure for an animal and has a door (11).

The waste-treatment tank (20) has a holding tank (22), a holder (21) and an optional flushing-water tank (30).

The holding tank (22) has an open top, a top edge, a sidewall, an outer door (200), an optional ramp (201), an internal chamber, multiple vertical partitions (220, 221, 222), a horizontal partition (223), multiple filter tubes (24), an outlet (228) and a vent tube (26). The sidewall has an opening facing the door (11) of the enclosure (10). The outer door (200) is mounted in the opening in the sidewall. The ramp (201) is mounted at an incline on the sidewall of the holding tank (22) outside the holding tank (22) for a pet to enter or leave the enclosure (10). The internal chamber is defined in the holding tank (22). The vertical partitions (220, 221, 222) are mounted inside the internal chamber. The vertical partitions (220, 221, 222) and the horizontal partition (223) are mounted inside the internal chamber and form a first chamber (224), multiple middle chambers (226) and a final chamber (225). The vertical partitions (220, 221, 222) further have multiple holes (2201, 2211, 2221). The holes (2201, 2211, 2221) are defined respectively in the corresponding vertical partitions (220, 221, 222), do not align with each other and provide a baffle effect. The horizontal partition (223) has a top surface and bottom surface. The filter tubes (24) are mounted on the top surface of the horizontal partition (223) and communicate with the middle chambers (226), and each filter tube (24) has multiple filter holes (240). The outlet (228) is formed through the sidewall in the final chamber (225) and maintains water in the holding tank (22) at an appropriate level. The vent tube (26) is mounted through the sidewall in the final chamber (225) to vent noxious gases.

The holder (21) is mounted in the open top of the holding tank (22) and has a top edge, a lip, a sidewall (210), an optional shoulder (211), a waste-collection tray (212), a trap (213) and an opening (214). The lip is formed on the top edge and is mounted on the top edge of the holding tank (22). The sidewall (210) has a bottom edge. The shoulder (211) is integrally formed at the bottom edge of the sidewall (210) to hold the enclosure (10). The waste-collection tray (212) is formed with the sidewall (210), has a flushing hole. The waste-collection tray (212) is inclined down and communicates the flushing hole. In a preferred embodiment, the waste-collection tray (212) is formed with the shoulder (211). The trap (213) is connected to the flushing hole in the waste-collection tray (212). The trap (213) is mounted facing to the first chamber (224). The opening (214) is defined in the sidewall (210) and corresponds to the door (11) of the enclosure (10).

The flushing-water tank (30) is mounted on the holder (21) and may be a conventional flushing-water tank.

Figure 4:
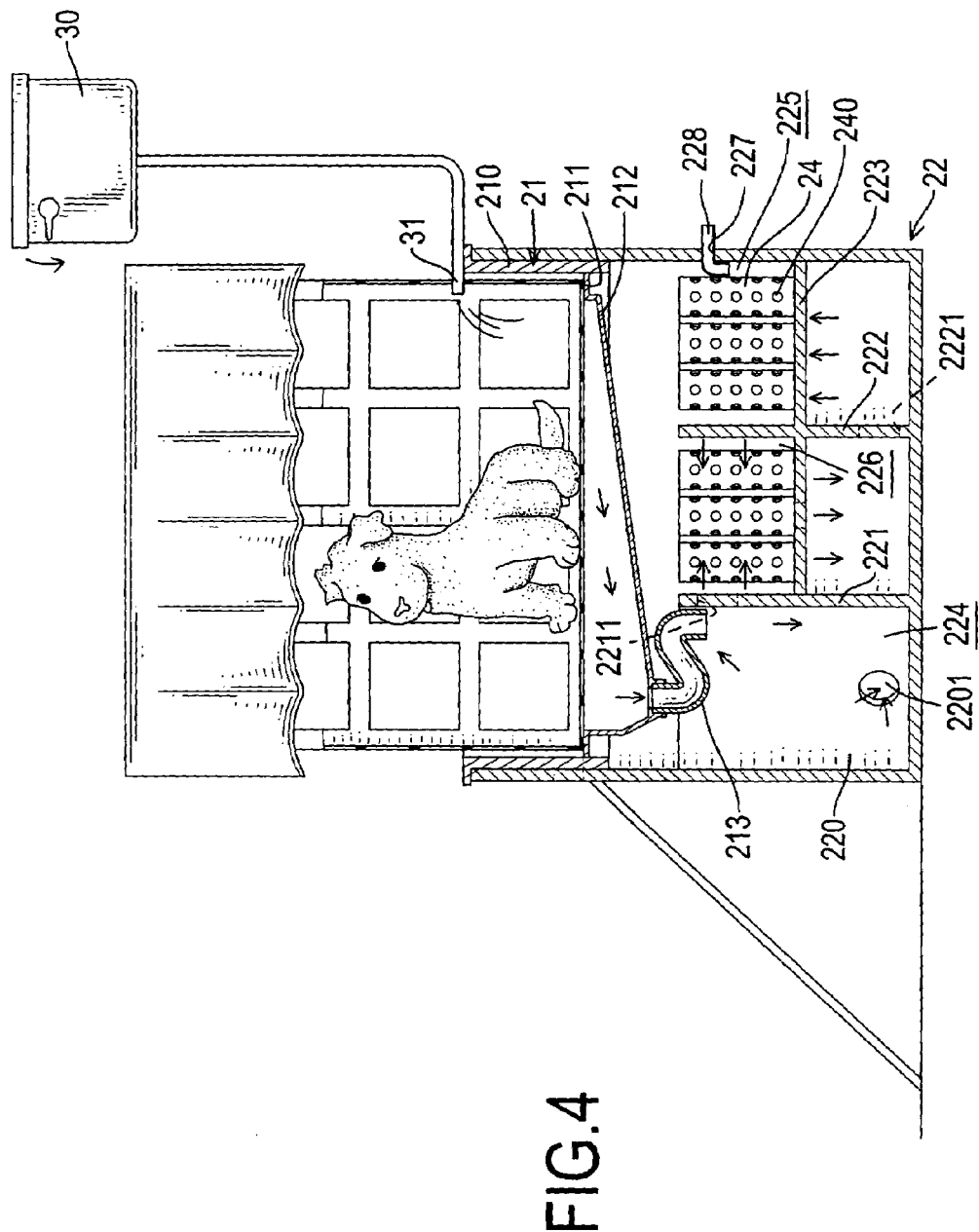
FIG. 4 is an operational side view of the cage in FIG. 1 with a pet inside.

With further reference to FIG. 4, water used to flush the waster-collection tray (212) passes through the trap (213) and collects in the first chamber (224). Before the water flows to the middle chambers (226), heavy sediment participates in the first chamber (224). Small particles suspended in the water may be carried through to the middle chambers (226), but are filtered out of the water by the filter tubes (24) before the water reaches the final chamber (225).

The advantages of the cage in accordance with the present invention follow.

1. The enclosure (10) is mounted inside the holder (21) so animal excrement will be held in the holder (21) even when animals such as male dogs or cats urinate and the urine will not splash out of the cage.

2. Because the trap (213) is the only passage between the holder (21) and the holding tank (22), and water inside the trap (213) seals the trap (213) to prevent noxious odors from escaping from the holding tank (22) back into the enclosure (10).

3. Solid waste is divided into small particles and settles inside the chambers (224, 225, 226), so solid waste will not pass directly into the external drain system.

4. The cage does not need to be cleaned everyday, so the cage reduces the work required of a person who cleans the cage.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cage comprising
    an enclosure having a door, and
    a waste-treatment tank attached below the enclosure and having a holding tank having
        an open top;
        a top edge;
        a sidewall having an opening facing the door of the enclosure,
        an outer door mounted in the opening in the sidewall,
        an internal chamber defined in the holding tank,
        multiple vertical partitions mounted inside the internal chamber and having
            multiple holes defined respectively in the corresponding vertical partitions to provide a baffle effect,
        a horizontal partition mounted perpendicular to the vertical partitions, having a top surface and forming
            a first chamber facing the trap,
            multiple middle chambers, and
            a final chamber,
        multiple filter tubes mounted on the top surface of the horizontal partition, communicating with the middle chambers and having multiple filter holes,
        an outlet formed through the sidewall in the final chamber, and
        a vent tube mounted through the sidewall in the final chamber; and
    a holder mounted in the open top of the holding tank and having
        a top edge,
        a lip formed on the top edge and mounted on the top edge of the holding tank,
        a sidewall having a bottom edge,
        a waste-collection tray formed with the sidewall and being inclined down, having a flushing hole defined in the waste-collection tray,
        a trap connected to the flushing hole in the waste-collection tray, and
        an opening defined in the sidewall and corresponding to the door of the enclosure.

2. The cage as claimed in claim 1, wherein the holder further comprises a shoulder integrally formed at the bottom edge of the sidewall.

3. The cage as claimed in claim 2, wherein the holding tank further comprises a ramp mounted at an incline on the sidewall of the holding tank outside the holding tank.

4. The cage as claimed in claim 3 which further comprise a flushing-water tank mounted on the holder.

5. The cage as claimed in claim 1, wherein the holding tank further comprises a ramp mounted at an incline on the sidewall of the holding tank outside the holding tank.

6. The cage as claimed in claim 1 which further comprise a flushing-water tank mounted on the holder.

* * * * *